J. A. COLE.
RECORDING APPARATUS.
APPLICATION FILED MAY 16, 1917.

1,286,537.

Patented Dec. 3, 1918.
2 SHEETS—SHEET 1.

Witnesses
Floyd R. Cornwall
Robt. E. Barry

Inventor
John A. Cole
By Whitaker & Prevost
Attorneys

J. A. COLE.
RECORDING APPARATUS.
APPLICATION FILED MAY 16, 1917.

1,286,537.

Patented Dec. 3, 1918.
2 SHEETS—SHEET 2.

Witnesses
Floyd R. Cornwall
Robt. E. Barry

Inventor
John A. Cole
By Whitaker & Prevost
Attorneys

UNITED STATES PATENT OFFICE.

JOHN A. COLE, OF CHICAGO, ILLINOIS.

RECORDING APPARATUS.

1,286,537.  Specification of Letters Patent.  Patented Dec. 3, 1918.

Application filed May 16, 1917. Serial No. 169,098.

*To all whom it may concern:*

Be it known that I, JOHN A. COLE, citizen of the United States, residing at Chicago, in the county of Cook and State of Illinois, have invented certain new and useful Improvements in Recording Apparatus; and I do hereby declare the following to be a full, clear, and exact description of the invention, such as will enable others skilled in the art to which it appertains to make and use the same.

My invention relates to improvements in recording mechanism designed particularly for use in connection with apparatus responsive to variations in the velocity of a flowing stream, although my improved device is not limited to this use.

One of the objects of my invention is to provide an automatic recorder which will permanently record, continuously or at intervals, the fluctuations in the velocity of a flowing stream.

A further object is to provide mechanism for transmitting the movements of the device which acts in response to variations in the velocity of the flowing stream, to the recording mechanism, with the least possible friction, whereby the greatest accuracy in recording is obtained.

With the foregoing and other objects in view, my invention consists in the novel features hereinafter described, reference being had to the accompanying drawings in which I have shown certain preferred forms or embodiments of the invention selected by me for the purposes of illustration, and the said invention is fully disclosed in the following description and claims.

Referring to the drawing.

Figures 1, 2:
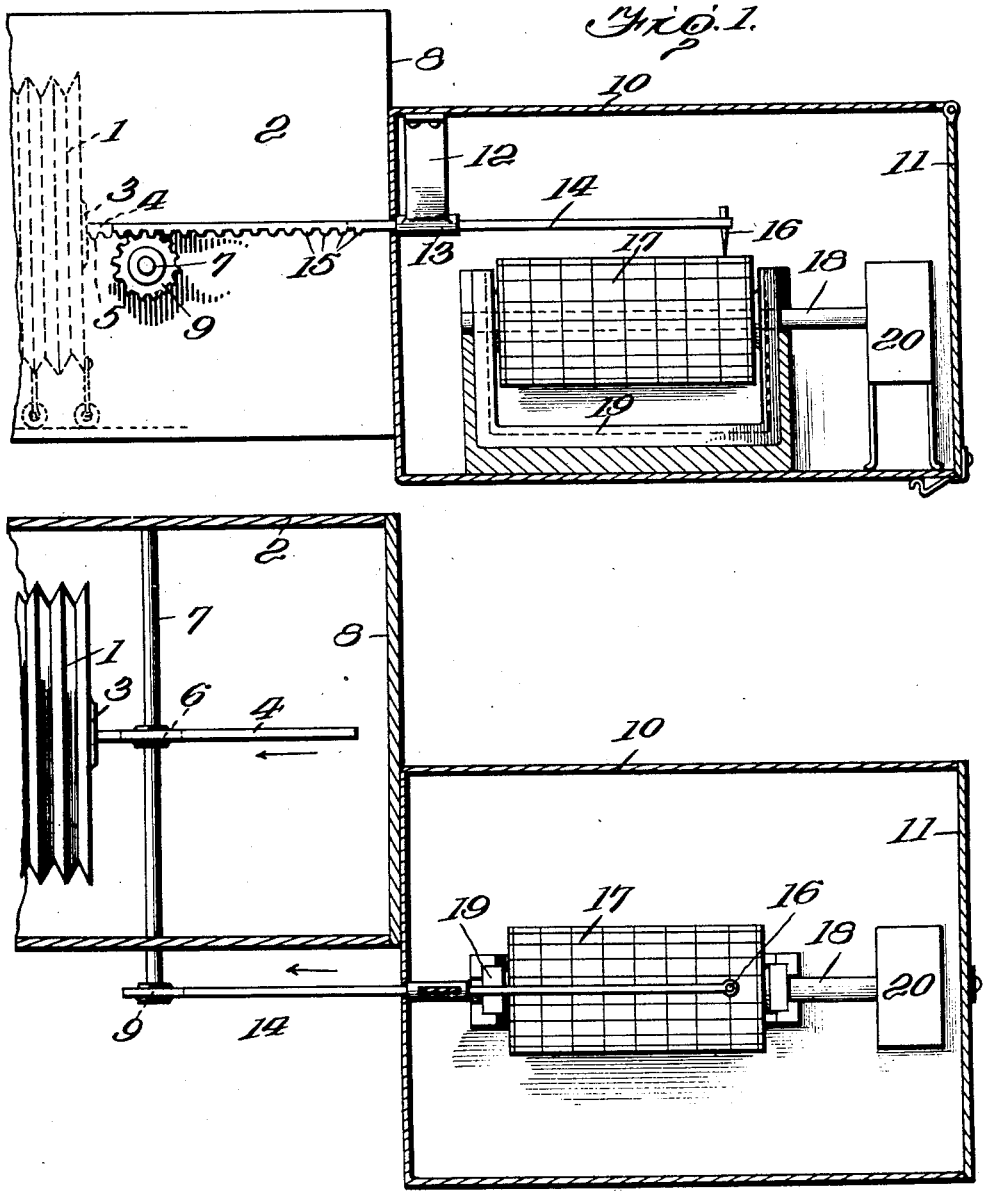
Figure 1 is a side view of a portion of an apparatus responsive to variations in the velocity of a flowing stream, and a vertical sectional view of the improved recorder which I employ in connection with said device.
Fig. 2 is a horizontal sectional view of the same.

In the drawings, 1 represents an expansible diaphragm, which is connected preferably with the up-stream tube of an ordinary pitometer and said diaphragm is mounted in a casing 2, which is connected with the down-stream tube of the pitometer in the known manner. It will be understood that the interior of the diaphragm communicates with the up-stream tube, so that the flowing water in a conduit, in which the pitometer is inserted, will enter the diaphragm and cause the same to expand and move toward the right, while the interior of the casing communicates with the down-stream tube and the drawing action of the water on the down-stream tube will also tend to expand the diaphragm.

If the pressure of the water in the conduit or main is heavy, it will cause a maximum expansion of the diaphragm while if the pressure is slight, the diaphragm will expand to a lesser extent. It is to record these movements of the free end of the diaphragm that I have devised my improved form of recorder, from which the amount of water flowing through the main may be calculated.

Rigidly carried by the movable end 3 of the diaphragm is a rack bar 4 provided on its lower side with teeth 5, which mesh with and drive a gear 6, keyed to a shaft 7. The casing 2 is of sufficient length to permit the diaphragm to expand the maximum amount without causing the free end of the rack 4 to contact with the end 8 of the casing.

The shaft 7 is journaled in the sides of the casing and one of its ends protrudes beyond the same and carries a fixed gear 9.

Secured to the end 8 of the casing 2 is a housing 10, having a hinged door 11, providing access to the interior of the same, and this housing carries a depending bracket 12 terminating in a bearing 13, which slidably supports a rod 14, the left hand portion of which extends outside of the housing and has teeth 15 meshing with the gear 9, and the right hand portion of which is movable within the housing and carries a marking point 16. It will be obvious, from the foregoing, that movements of the diaphragm will be transmitted through the racks, gears and shaft to the pointer with the least possible friction.

In the embodiment of my invention shown in Figs. 1 and 2, this marking point coöperates with a record sheet 17 carried by a drum mounted on a shaft 18 journaled in a bracket 19. This shaft is adapted to be continuously and slowly driven by a clock work mechanism 20 designed to rotate the drum one revolution in a day or a week, as may be desired. As the drum rotates the movements of the marking point will be recorded on the record sheet and from this record sheet the amount of water flowing through the main, during a certain period of time, may be calculated in the known manner. The device shown in Figs. 1 and 2 is designed to continuously record the flow, while the device shown in Figs. 3 and 4 records the flow at intervals, which may be predetermined.

Figure 3:
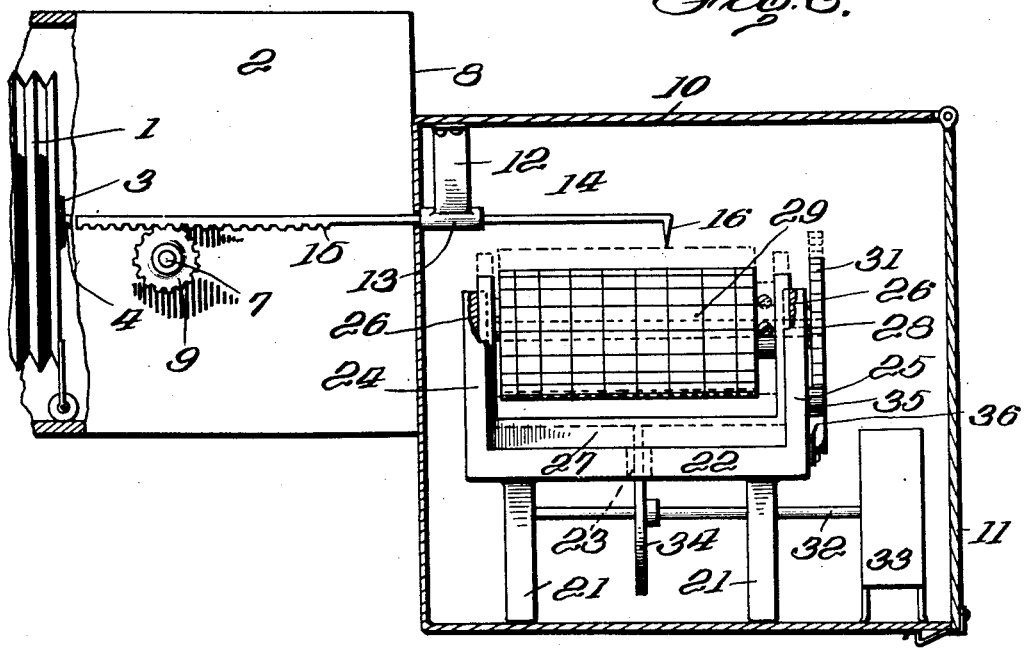
Fig. 3 is a view similar to Fig. 1, showing a modified form of recorder.
Figure 4:
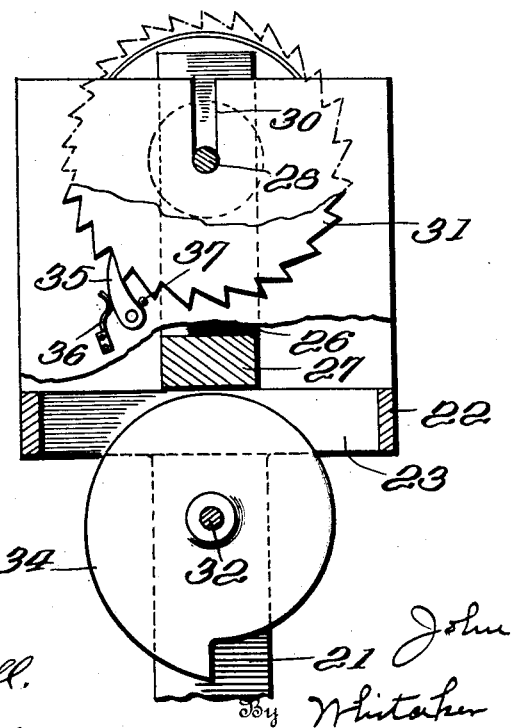
Fig. 4 is an end view, partly in section, of a detail of the modified form.

In the embodiment of the invention shown in Figs. 3 and 4, the numeral 21 designates legs, which support a yoke-shaped member 22. This yoke-shaped member has its lower portion slotted at 23 and its side arms 24 and 25 grooved at 26, to slidably support a U-shaped bracket 27 carrying a spindle 28 upon which is mounted a drum containing a suitable record sheet 29.

The ends of the spindle 28 are movably mounted in slots 30 in the side arms of the member 27 and one end of the spindle 28 is provided with a fixed ratchet wheel 31.

A rotatable shaft 32 is journaled in the legs 21 and is designed to be continuously rotated by clock work mechanism 33. Keyed to the shaft 32 is a fixed cam 34 which operates through the slot 23 and engages the lower bar of the U-shaped member 27, so that upon each revolution of the cam 34, the U-shaped member 27, the spindle 28, drum and ratchet wheel 31 will be raised whereby the record sheet 30 on the drum, will be brought into contact with the marking point 16 and cause an impression to be made upon the record sheet, which will set forth the velocity of the flowing stream.

In order to bring a new surface of the record sheet into position to be acted upon by the point 16, I have provided the side arm 25 of the member 22 with a pivoted pawl 35, which is designed when the ratchet wheel 31 is raised, to be forced in one direction by a spring 36 into contact with a pin or stop 37, so that upon lowering the wheel 31, the pawl 36 will engage the next tooth of the ratchet wheel and turn the drum a distance corresponding to one tooth. It is my intention to regulate the clock work mechanism, to rotate the cam 34 every five minutes and so rule the sheet 29 and arrange the pawl and ratchet mechanism, that the drum will be rotated a thirty-second of an inch each time the drum is raised, so that a complete record marked every five minutes, will be provided, for the entire day.

What I claim and desire to secure by Letters Patent is:—

1. A recording apparatus comprising a diaphragm movable in response to variations in the force being measured, an axially movable rod operated by said diaphragm and carrying a marking device, a rotatable drum carrying a record sheet with which said marking device coöperates, and means for moving said drum toward said marking device at predetermined periods, whereby said marking device will mark said record sheet.

2. A recording device comprising a marking device responsive to variations in the force being measured, a bracket movable relative to said marking device, a drum rotatably mounted on said bracket and carrying a record sheet with which said marking device coöperates, and means for moving said bracket and drum toward and away from said marking device.

3. A recording apparatus, comprising a casing, a yoke-shaped member mounted in said casing and provided with guides, a U-shaped member slidably mounted in said guides, a drum carrying a record sheet rotatably mounted in said U-shaped member, means for intermittently rotating said drum, means for moving said drum toward and away from the lower bar of said yoke-shaped member, and a pointer responsive to variations in the force being measured, designed to coöperate with said record sheet.

4. A recording device comprising a pointer movable in response to variations in the force being measured, a casing, a supporting member mounted in said casing and provided with guides, a U-shaped member slidably mounted in said guides, a shaft rotatably mounted in said U-shaped member, a drum carried by said shaft and supporting a record sheet, means for intermittently rotating said drum and means for moving said drum toward and away from said pointer.

5. A recording device comprising a pointer movable in response to variations in the force being measured, a casing, a supporting member provided in said guides and carrying a rotatable shaft, a drum and ratchet rigidly mounted on said shaft, a record sheet carried by the drum, a pawl pivotally mounted on said supporting member, a spring for forcing the pawl in one direction, a stop for limiting the movement of the pawl and means for moving said record sheet into contact with said pointer and for raising said ratchet to permit the pawl to engage its stop and also engage the adjacent tooth of the ratchet when said ratchet is lowered.

6. A recording device comprising a pointer movable in response to variations in the force being measured, a casing, a supporting member mounted in said casing and carrying a continuously rotatable shaft, a cam rigidly mounted on said shaft, guides provided in said supporting member, a U-shaped member slidably mounted in said guides and engaging said cam, a shaft rotatably mounted in said U-shaped member and carrying a fixed drum and ratchet, a record sheet carried by said drum, a pawl mounted on said supporting member and adapted to coöperate with the teeth of said ratchet and means for rotating the cam shaft whereby said record sheet may be brought into contact with the pointer and the pawl be brought into engagement with the next tooth of the ratchet.

In testimony whereof I affix my signature.

JOHN A. COLE.